United States Patent [19]

Grady et al.

[11] 3,898,489

[45] Aug. 5, 1975

[54] PIEZOELECTRIC RESONATORS INCLUDING MASS LOADING TO ATTENUATE SPURIOUS MODES

[75] Inventors: John J. Grady, Chicago; Theodore E. Lind, Lombard, both of Ill.

[73] Assignee: Motorola, Inc., Chicago, Ill.

[22] Filed: Mar. 4, 1974

[21] Appl. No.: 448,139

[52] U.S. Cl. .................... 310/9.8; 310/8.2; 310/9.5; 333/72

[51] Int. Cl. .................... H04r 17/00

[58] Field of Search .......... 310/8.2, 9.7, 9.8; 333/72

[56] References Cited

UNITED STATES PATENTS

| | | | |
|---|---|---|---|
| 3,382,381 | 5/1968 | Horton | 310/8.2 |
| 3,517,350 | 6/1970 | Beaver | 310/9.8 X |
| 3,564,463 | 2/1971 | Beaver et al. | 310/9.8 X |
| 3,676,805 | 7/1972 | Mason | 310/8.2 X |
| 3,684,905 | 8/1972 | Martyn | 310/8.2 |
| 3,732,510 | 5/1973 | Mason | 310/8.2 X |

*Primary Examiner*—Mark O. Budd
*Attorney, Agent, or Firm*—Eugene A. Parsons; Vincent J. Rauner

[57] ABSTRACT

A piezoelectric resonator, formed of a plate of quartz having two major surfaces and an adjoining edge therearound, includes at least one electrode plated on each major surface with an electrically conducting connecting tab plated on the surface so as to extend from the electrode to the outer edge. The resonator portion under the connecting tabs is mass loaded by pseudo tabs plated on the opposite major surface so that spurious modes are propagated from the electrodes outwardly to the edge. The pseudo tabs are spaced from the electrodes a distance sufficient to allow propagation of the spurious modes while decoupling substantial propagation of the main mode into the tab area.

7 Claims, 3 Drawing Figures

PIEZOELECTRIC RESONATORS INCLUDING MASS LOADING TO ATTENUATE SPURIOUS MODES

BACKGROUND OF THE INVENTION

1. Field Of The Invention

Piezoelectric resonators, such as AT cut quartz resonators and particularly those used in filters such as monolithic coupled crystal units, are subject to spurious modes of oscillation. The majority of the spurious responses in a piezoelectric resonator can be attenuated by application of Bechmann's wave trapping criteria which relates the frequency of the unit, the electrode area and the amount of mass loading to provide optimum spurious suppression. However, some strong spurious responses still exist in piezoelectric resonators, and particularly those used in filters such as monolithic coupled crystal units, after the electrode area has been optimized under wave trapping criteria.

2. Description Of The Prior Art

In the prior art, it was discovered that the inharmonic or spurious modes are not confined to the electrode area and can be affected by application of a low Q material to the surface of the plate of piezoelectric material. This low Q material must be applied to specific locations on the plate, generally on the metallic connecting tabs which connect the electrodes to the crystal blank support structure. For Examples of this type of spurious mode damping see U.S. Pat. No. 3,382,381, entitled "Tab Plateback," issued to W. H. Horton, U.S. Pat. No. 3,585,418, entitled "Piezoelectric Resonators and Method of Tuning the Same," issued to Donald J. Koneval and U.S. Pat. No. 3,684,905, entitled "Piezoelectric Crystal Device Including Loading Elements Having The Shape of Chordal Sections," issued to Lloyd G. Martyn. Most of the individuals working with the prior art thought that the low Q material selectively damps or de Q's the undesired inharmonic thickness shear modes.

SUMMARY OF THE INVENTION

The present invention pertains to a piezoelectric resonator with attenuated spurious response including a piezoelectric crystal plate having at least one electrode fixedly positioned in overlying relationship on each major surface with an electrically conducting connecting tab fixedly positioned in overlying relationship on each surface and extending from electrical connection with the electrode to the outer edge of the plate and a pseudo tab positioned in overlying relationship on each major surface of the plate approximately directly opposite the connecting tabs and spaced from said electrodes a distance sufficient to allow propagation of the spurious modes between said connecting tabs and said pseudo tabs toward the outer edge of the plate while decoupling substantial propagation of the main mode.

Generally, the electrodes and tabs are plated onto the surface of the crystal plate and, for convenience, will have the same thickness. Further, the electrodes and connecting tabs cover approximately the same area of the surface of the plate while the pseudo tabs cover approximately the same area but are spaced slightly from the electrodes to prevent propagation of the main mode toward the edge of the plate. The optimum plating configuration in the tab area is arrived at by optimizing the area of the tab and the mass loading of the tab by wave trapping criteria.

It is an object of the present invention to provide an improved piezoelectric resonator with attenuated spurious response.

It is a further object of the present invention to provide a piezoelectric resonator wherein the undesired thickness shear modes, or spurious modes, are coupled or permitted to propagate along the piezoelectric plate in the areas which are mass loaded by the connection and pseudo tabs.

These and other objects of this invention will become apparent to those skilled in the art upon consideration of the accompanying specification, claims and drawings.

BRIEF DESCRIPTION OF THE DRAWINGS

Referring to the figures, wherein like characters indicate like parts throughout the figures.

DESCRIPTION OF THE PREFERRED EMBODIMENT

Figure 1:
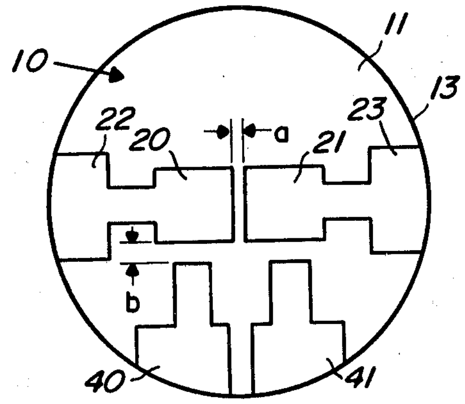
FIG. 1 is a plan view of a first side of a piezoelectric resonator incorporating an embodiment of the present invention.
Figure 2:
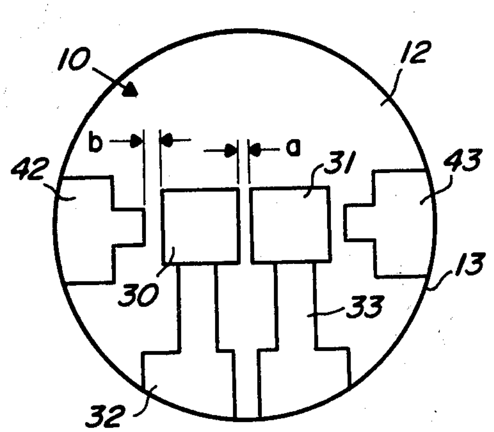
FIG. 2 is a plan view of the opposite side of the resonator illustrated in FIG. 1.

Referring to FIGS. 1 and 2, a circular piezoelectric plate, generally indicated by the numeral 10, is illustrated having a first major surface 11 and an opposite major surface 12 with a connecting edge 13 therearound. In the present embodiment the plate 10 is an AT cut quartz crystal but it should be understood that other types of cut may be provided from quartz or other types of piezoelectric material and the plate may have other configurations, such as square, etc. The first surface 11 of the plate 10 has a pair of electrodes 20 and 21 affixed thereto in overlying relationship by some convenient method, such as plating or the like. The electrodes 20 and 21 are applied in accordance with Bechmann's wave trapping criteria to provide optimum spurious suppression. Further, the electrodes 20 and 21 lie along a line parallel with the X crystallographic axis of the quartz forming the plate 10 and are spaced apart along the X axis a distance sufficient to allow coupling of the main mode therebetween.

An electrically conducting connecting tab 22 is plated onto the surface 11 in connection with the electrode 20 and extending outwardly to the edge 13. A second electrically conducting connecting tab 23 is plated on the surface 11 in connection with the electrode 21 and extends outwardly to the edge 13. The connecting tabs 22 and 23 extend radially outwardly along the X axis from the electrodes 20 and 21 in opposite directions on the surface 11. The particular configuration of the connecting tabs 22 and 23 was chosen so that the overall area of each of the connecting tabs 22 and 23 is approximately equal to the area of each of the electrodes 20 and 21, for reasons which will be explained presently.

Referring to FIG. 2, the surface 12 of plate 10 has a pair of electrodes 30 and 31 fixedly positioned in overlying relationship thereon, by some means such as plating or the like. Electrode 30 is directly opposite and approximately coextensive with electrode 21 and electrode 31 is directly opposite and approximately coextensive with electrode 20. An electrically conducting connecting tab 32 is fixedly positioned on the surface 12 and extends from contact with the electrode 30 to the edge 13. The connecting tab 32 extends in a direction generally perpendicular to the X crystallographic axis and the direction of the tab 22. A second electrically conducting connecting tab 33 is fixedly positioned in overlying relationship on the surface 12 and extends from electrical contact with the electrode 31 outwardly, generally perpendicular to the X crystallographic axis, to the edge 13. The tabs 32 and 33 extend generally parallel and in spaced apart relationship. Further, the tabs 32 and 33 have the same configuration as the tabs 22 and 23 and approximately the same area and thickness. Thus, the electrodes 20, 21, 30 and 31 and the connecting tabs 22, 23, 32 and 33 on the surfaces 11 and 12 of the plate 10 form a complete piezoelectric resonator. As is well known by those skilled in the art, when a signal including the specific frequency of the resonator is applied between the connecting tabs 22 and 33, an output signal substantially composed of the specific frequency of the resonator will be available between the tabs 23 and 32. However, this output signal will also contain spurious response or frequencies produced by the inharmonic thickness shear modes of the crystal plate 10.

Referring to FIG. 1, a first pseudo tab 40 is fixedly positioned in overlying relationship on surface 11 approximately coextensive with and directly opposite the connecting tab 33. A second pseudo tab 41 is fixedly positioned in overlying relationship on the surface 11 approximately coextensive with and directly opposite the connecting tab 32. Both of the pseudo tabs 40 and 41 are spaced from the electrodes 20 and 21, respectively, a distance designated *b*, so there is no electrical contact between the pseudo tabs 40, 41 and the electrodes 20, 21. The pseudo tabs 40 and 41 cover approximately the same area as the connecting tabs 32 and 33 (except for the small spacing b) and the thickness is approximately equal. In practice the electrodes 20 and 21, the connecting tabs 22 and 23, and the pseudo tabs 40 and 41 are plated onto the surface 11 simultaneously so that the thicknesses thereof are all similar. Further, in accordance with Bechmann's wave trapping criteria the thickness of the material and area are related to the frequency of the unit so that spurious responses which propagate between the electrode pairs 20–31 and 21–30 will also propagate between tabs 33–40 and 32–41 when the area and thickness of each of the tabs is approximately equal to the area and thickness of each of the electrodes.

Referring to FIG. 2, a pair of pseudo tabs 42 and 43 are fixedly positioned in overlying relationship on the surface 12 generally coextensive with and directly opposite the connecting tabs 23 and 22, respectively. The pseudo tabs 42 and 43 are spaced from the electrodes 30 and 31, respectively, by the distance *b* so there is no electrical contact between the pseudo tabs 42 and 43 and the electrodes 30 and 31. Further, the electrodes 30 and 31, the connecting tabs 32 and 33, and the pseudo tabs 42 and 43 will generally be plated onto the surface 12 simultaneously so that the thicknesses thereof will be similar (and generally similar to the tabs and electrodes on the surface 11) with the areas of the pseudo tabs 42 and 43 being approximately equal to the areas of the electrodes 30 and 31 and the connecting tabs 32 and 33 (except for the small portion b removed therefrom).

Figure 3:
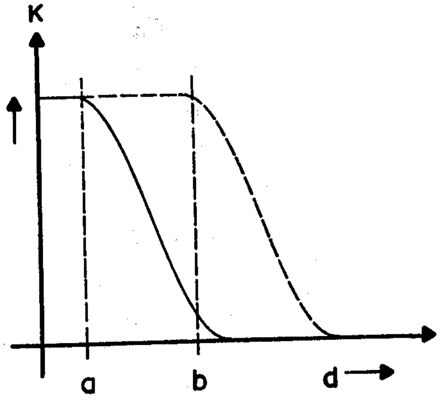
FIG. 3 is a graphical presentation illustrating the amount of propagation of the main and spurious modes versus distance from the electrode.

Referring to FIG. 3, a graph is illustrated wherein the abscissa indicates distance from the electrode and the ordinate indicates the amplitude of the signal. A solid line drawn on the graph approximates the main mode or specific frequency of the resonator illustrated in FIGS. 1 and 2 and the dotted line approximates the spurious response of the resonator illustrated in FIGS. 1 and 2. From the graph of FIG. 3 it is apparent that the spurious response propagates a greater distance in the plate 10 than the main mode. Thus, the pairs of electrodes 20–31 and 21–30 are spaced apart a distance *a*, which distance is illustrated on the graph in FIG. 3 and appears well within the peak propagation distance of the main mode. The pseudo tabs 40, 41, 42 and 43 are spaced a distance *b* from the electrodes 20, 21, 30 and 31, respectively, which distance *b* is greater than the distance *a* and lies approximately within the peak propagation distance for the spurious mode but substantially outside of the propagation distance of the main mode. Thus, the spurious response will propagate along the pairs of tabs to the edge 13 where it will be harmlessly dissipated but the spacing between the pseudo tabs and the electrodes will decouple substantial propagation of the main mode to prevent loading or dissipation thereof.

Thus, an improved piezoelectric resonator with attenuated spurious response is disclosed, which resonator can be produced with slight modification of existing plating masks to deposit a thin film having an optimum configuration on the major surfaces of the plate. The present structure is considerably simpler to produce and substantially attenuates inharmonic thickness shear modes. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A piezoelectric resonator with attenuated spurious response comprising:

a. a piezoelectric crystal plate having two major surfaces and a surrounding edge;

b. an electrode fixedly positioned in overlying relationship on each of said major surfaces, said electrodes being approximately coextensive and directly opposite and providing a main frequency mode of operation and spurious modes upon proper energization thereof;

c. an electrically conducting tab fixedly positioned in overlying relationship on each of said major surfaces and extending from electrical connection with said electrode on each respective major surface outwardly to the surrounding edge of the major surface, said conducting tabs extending outwardly to the surrounding edge in different directions so substantially no portions thereof are directly opposite each other;

d. a pseudo tab positioned in overlying relationship on each of said major surfaces approximately coextensive with and directly opposite each of said conducting tabs, said pseudo tabs being spaced from said electrodes a distance sufficient to allow propagation of the spurious modes between said conducting tabs and said pseudo tabs toward the outer edge of said plate while decoupling substantial propagation of the main mode.

2. A piezoelectric resonator as claimed in claim 1 wherein the electrodes, conducting tabs and pseudo tabs all include material plated on the major surfaces of the piezoelectric crystal plate.

3. A piezoelectric resonator as claimed in claim 2 wherein the electrodes, conducting tabs and pseudo tabs all have approximately equal thicknesses.

4. A piezoelectric resonator as claimed in claim 3 wherein the electrodes and conducting tabs each overlie approximately the same amount of area of the major surfaces.

5. A piezoelectric resonator as claimed in claim 1 wherein the resonator includes two spaced apart electrodes on each major surface with a conducting tab extending outwardly to the edge from each electrode and a pseudo tab directly opposite each conducting tab.

6. A piezoelectric resonator as claimed in claim 5 wherein the two electrodes are positioned to lie on a line extending parallel to the X crystallographic axis.

7. A piezoelectric resonator as claimed in claim 5 wherein the spacing between the electrodes on each major surface is less than the spacing between the pseudo tabs and the electrodes.

* * * * *